United States Patent [19]
Awata et al.

[11] Patent Number: 5,375,147
[45] Date of Patent: Dec. 20, 1994

[54] JITTER COMPENSATING DEVICE

[75] Inventors: Yutaka Awata; Mitsuo Kakuishi; Nobukazu Koizumi, all of Kawasaki, Japan

[73] Assignee: Fujitsu Limited, Japan

[21] Appl. No.: 932,635

[22] Filed: Aug. 20, 1992

[30] Foreign Application Priority Data

Aug. 21, 1991 [JP] Japan .................... 3-209434

[51] Int. Cl.⁵ ............................. H04L 7/00
[52] U.S. Cl. ..................... 375/118; 375/14; 370/32.1; 379/411
[58] Field of Search .............. 375/118, 11–16; 364/724.01; 370/105.3, 32.1; 379/406, 411, 410; 333/18, 28 R

[56] References Cited
U.S. PATENT DOCUMENTS 4,605,826  8/1986  Kanemasa .............. 370/32.1
4,868,874  9/1989  Takatori et al. .......... 379/411

FOREIGN PATENT DOCUMENTS 0315191  5/1989  European Pat. Off. .
3804332A1  8/1989  Germany .

Primary Examiner—Stephen Chin
Assistant Examiner—Hai H. Phan
Attorney, Agent, or Firm—Greer, Burns & Crain, Ltd.

[57] ABSTRACT

An impulse response of a litter may change in the output of a filter unit immediately after the generation of a litter according to a sampling timing signal from a timing regenerating unit if a filter unit is provided between an A/D converting unit and an echo canceler. In this case, a selecting unit in a jitter compensating unit compensates an uncanceled echo through each of the outputs sequentially selected by a plurality of adaptive filter unit. Plural sets of tap coefficients are stored in a tap coefficient storage unit, from which the selecting unit sequentially reads them to operate one adaptive filter unit, thereby reducing the size of a jitter compensating circuit.

4 Claims, 9 Drawing Sheets

JITTER COMPENSATING DEVICE

BACKGROUND OF THE INVENTION

The present invention relates to a transmission system comprising an echo canceler for removing an echo component echoing from a sending side to a receiving side, and a timing regenerating unit for regenerating sampling timing at the A/D conversion from a received A/D converted signal, and more specifically to a jitter compensating device for compensating a phase jump (jitter) generated in the timing regenerating unit at echo cancellation.

A two-wire digital subscriber line transmission system operated through a hybrid circuit is a configurational example of a digital subscriber line transmission system.

FIG. 1 shows a configurational example of the above described digital subscriber line transmission system.

An encoder (COD) 101 converts binary digital transmission data to a transmission code (for example, a 2B1Q code).

A line driver unit (DRV) 102 drives a subscriber line 104 to transmit a transmission code.

A hybrid unit (HYB) 103 performs a two-wire/four-wire conversion between the two-wire subscriber line 104 and a two-wire transmission line 105 or a two-wire receiving line 106.

An A/D converting unit (ADC) 107 converts a signal, a combination of the echo of a transmission signal leaked through the hybrid unit 103 and the received signal (an analog signal) sent from the correspondent and attenuated in the subscriber line 104, to a digital signal.

An echo canceler (EC) 108 and an adder 109 cancel the above described echo.

A jitter compensating circuit (JC) 110 and an adder 111 compensate the echo leaked through the echo canceler 108 when the phase of a sampling timing signal 114 of the A/D converting unit 107 generated by a timing regenerating circuit 113 described later jumps.

An equalizer (EQL) 112 equalizes a received signal sent from the correspondent and attenuated in the subscriber line 104.

The timing regenerating circuit (TIM) 113 regenerates from the received signal the sampling timing signal 114 of the A/D converting unit 107.

In the two-wire digital subscriber line transmission system having a hybrid circuit configured as described above, an echo leaks from a sending side to a receiving side through the hybrid unit 103. The received signal transmitted through the subscriber line 104 is attenuated considerably. Therefore, the intensity ratio of an echo to a received signal may reach several tens of decibels. Accordingly, in the above described transmission, echoes must be canceled in the echo canceling process by the echo canceler 108 and the jitter compensating circuit 110.

FIG. 2 shows an example of the configuration of the echo canceler 108 and the adder 109 shown in FIG. 1.

In FIG. 2, $X_j$ is an inputted echo at discrete time j (hereinafter referred to as time 3), $ER_j$ is an echo replica generated at time j, $a_j$ is a transmission symbol at time j, $C_0$–$C_N$ are tap coefficients, and $\epsilon_j$ is a signal of an error between an inputted echo $X_j$ and the echo replica $ER_j$.

First, the echo replica $ER_j$ is calculated using the following expression by the configuration containing a delay circuit 202 for delaying a signal by 1 sampling timing T, a multiplier 203, and an adder 204. "*" indicates a multiplication.

$$ER_j = \sum_{n=0}^{N} (a_{j-n} * C_n) \quad (1)$$

The error signal $\epsilon_j$ is calculated by the adder (subtracter) 109 using the following expression.

$$\epsilon_j = X_j - ER_j \quad (2)$$

A tap coefficient update unit 201 updates tap coefficients $C_0$–$C_N$ to attenuate the above described error signal $\epsilon_j$. The following expression shows an example of a tap coefficient updating algorithm, where $\alpha$ indicates a constant.

$$C_n = C_n + \alpha \cdot a_{j-n} \cdot \epsilon_j \quad (j: \text{time}, n = 0 \sim N) \quad (3)$$

Next, timing regeneration control in the transmission system comprising the digital subscriber line transmission system shown in FIG. 1 is explained.

First, digital subscriber line transmission systems shown in FIG. 1 are provided on the sides of a station and a subscriber face to face with each other connected by the subscriber line 104.

In the transmission system on the station side, transmission data are transmitted after being encoded by the encoder 101 in synchronism with a local oscillation clock generated by its own oscillator, while received data are A/D converted by the A/D converting unit 107 according to the sampling timing signal 114 regenerated from a received signal by the timing regenerating circuit 113. In the transmission system on the subscriber side, received data are, as on the station side, A/D converted by the A/D converting unit 107 according to the sampling timing signal 114 regenerated from a received signal by the timing regenerating circuit 113. Transmission data are, unlike on the station side, sent after being encoded by the encoder 101 in synchronism with the above described sampling timing signal 114.

When the timing regenerating circuit 113 changes the phase of the regenerated reception timing, the regenerated reception timing gives a change in the phase of the transmission timing before and after its own change in the transmission system on the station side. However, in the transmission system on the subscriber side, the regenerated reception timing gives a change in the phase of the transmission timing before its own change, but does not give a change in the phase of the transmission timing after its own change.

If the timing regenerating circuit 113 controls the phase of the sampling timing signal 114 provided for the A/D converting unit 107 in the DPLL (digitally phase locked loop) method, the phase of the sampling timing signal 114 jumps during the control process, wherein a jitter may be caused.

The jitter is compensated for by the jitter compensating circuit 110 and the adder 111 shown in FIG. 1. FIG. 3 shows an example of the configuration containing the jitter compensating circuit 110 and the adder 111.

In FIG. 3, The EC 108 and the adder 109 are the same as those shown in FIG. 1. $F_j$ is a residue as uncancelled echo at time j; $JR_j$ is a jitter compensating replica generated at time j; $a_j$ is a transmission symbol at time j; $J_0$–$J_K$ are tap coefficients; and $\epsilon_j'$ is a signal of an error between the residue as uncanceled echo $F_j$ and the jitter compensating replica $JR_j$ at time j. D indicates jitter directional data instructed by the timing regenerating circuit 113, and shows −1 when controlling a fast phase, +1 when controlling a delayed phase, and − when no control is performed.

In this case, the phase of the sampling timing signal 114 regenerated on the receiving side of the transmission system of the station is relatively changed by the timing signal generated uniquely by the local oscillator on the transmission side. Therefore, an echo is canceled and a jitter is compensated in the transmission on the station side based on the following principle.

Assume, for simplification of explanation, that the echo canceler 108 and the adder 109 (refer to FIGS. 1 and 2) cancel at each sampling timing each of the echo components, which are generated based on a transmission symbol outputted by the encoder 101 at a transmission timing and sampled by the A/D converting unit 107 at each of the timing $t_0$, $t_1$, $t_2$, ..., for example, shown in FIG. 4, using the echo replica components generated based on the tap coefficients $C_0$, $C_1$, $C_2$.

At sampling timing $t_0$, for example, the timing regenerating circuit 113 is assumed to cause the phase of the sampling timing signal 114 to jump forward or backward to the relative phase P or M, before or after the relative phase 0.

If the relative phase of the sampling timing signal 114 is 0, an echo component can be canceled as shown in FIG. 4 only by an echo replica component according to a tap coefficient $C_0$ from the echo canceler 108 at timing $T_0$. Hereafter, at each of the timing $t_1$, $t_2$ ..., an echo component can be canceled only by an echo replica component according to a tap coefficient $C_0$ from the echo canceler 108.

Actually, echo is generated continuously according to each transmission symbol outputted by the encoder 101 at each transmission timing. On the receiving side, echoes generated at each transmission timing are composed and A/D converted. Thus, at one sampling timing, an echo component composed at the timing is canceled by a sum $ER_j$(FIG. 2) of the echo replica components according to a plurality of tap coefficients $C_0$-$C_N$ from the echo canceler 108.

If the relative phase of the sampling timing signal 114 jumps to P, an echo component can be canceled at timing $t_0$ by the echo replica component according to the tap coefficient $C_0$ from the echo canceler 108 and the jitter compensating replica component according to the tap coefficient $J_{0P}$ from the jitter compensating circuit 110. Hereinafter, at each of the timing $t_1$, $t_2$ ..., an echo component at each timing can be canceled by each of the echo replica components according to each of the tap coefficients $C_1$, $C_2$... from the echo canceler 108, and by each of the jitter compensating replica components according to each of the tap coefficients $J_{1p}$, $J_{2p}$, ... from the jitter compensating circuit 110.

In this case, composed echo components each being generated continuously according to each of the transmission symbols are A/D converted on the receiving side. Therefore, at one sampling timing, the composed echo components at the timing can be canceled by the sum $ER_j$ of echo replica components according to a plurality of tap coefficients $C_0$-$C_N$ from the echo canceler 108, and the sum $JR_j$(FIG. 3) of the jitter compensating replica components according to a plurality of tap coefficients $J_0$-$J_K$ from the jitter compensating circuit 110.

Likewise, when the relative phase of the sampling timing signal 114 Jumps to M, an echo can be canceled at timing $t_0$ by the echo replica component according to the tap coefficient $C_0$ from the echo canceler 108, and the jitter compensating component according to the tap coefficient $J_{0M}$ from the jitter compensating circuit 110. Hereinafter, at each timing $t_1$, $t_2$, an echo component can be canceled at each timing by each of the jitter compensating replica components according to each of the tap coefficients $C_1$, $C_2$, ... from the echo canceler 108, and each of the jitter compensating replica components according to each of the tap coefficients $J_{1M}$-$J_{2M}$, ... from the jitter compensating circuit 110.

In this case, each of the echo components are continuously generated according to each of the transmission symbols, composed, and then A/D converted on the receiving side. Therefore, at a sampling timing, composed echo components are canceled by the sum $ER_j$ of echo replica components according to a plurality of tap coefficients $C_0$-$C_N$ from the echo canceler 108, and the sum $JR_j$ of jitter compensating replica components according to a plurality of tap coefficients $J_0$-$J_K$ from the jitter compensating circuit 110.

According to the principle of the above described jitter compensation, the jitter compensation replica $JR_j$ can be calculated as follows by a delay circuit 302 for delaying a signal by 1 sampling timing T, multipliers 303 and 304, and an adder 305, shown in FIG. 3, in the jitter compensating circuit 110 of the transmission system on the station side.

$$JR_j = \sum_{k=0}^{K} (a_{j-k} * J_k * D) \qquad (4)$$

In a small phase range where the relative phase of the sampling timing signal 114 jumps through the timing regenerating circuit 113, an approximation of an echo component can be obtained by a linear increment/decrement. Therefore, each of the tap coefficients $J_{0P}$, $J_{1P}$, $J_{2P}$, ... when the relative phase of the sampling timing signal 114 Jumps to P and each of the coefficients $J_{0M}$, $J_{1M}$-$J_{2M}$, ... when the relative phase of the sampling timing signal 114 jumps to M can be approximated to be equal in value, but with an opposite sign respectively.

According to the fact, the jitter compensating circuit 110 shown in FIG. 3, a tap coefficient can be obtained to generate a jitter compensating replica $JR_j$ by multiplying each of the tap coefficients $J_0$, $J_1$, $J_2$, ... by a value in data D (−1, 0, or +1) for indicating the direction of a jitter as instructed by the timing regenerating circuit 113 by each of the multipliers 304 as shown by the above described expression 4.

Next, an error signal $\epsilon_j$ is obtained by the adder (subtracter) 111 using the following expression.

$$\epsilon_j = X_j - ER_j - JR_j \qquad (5)$$

A tap coefficient update unit 301 updates tap coefficients $J_0$-$J_K$ to reduce the above described error signal $\epsilon_j'$. The following expression shows an example of an algorithm for updating a tap coefficient, where $\beta$ indicates a constant.

$$J_k = J_k + \beta \cdot a_{j-k} \cdot D \cdot \epsilon_j' \quad (j\text{: time}, 0 \leq k \leq K) \qquad (6)$$

In the explanation above, the timing regenerating circuit 113 causes jitters at the relative phase P or M (before or after the relative phase 0) in the transmission system on the station side. However, when a phase is shifted continuously, for example, during the training for a timing regeneration, the phase is shifted after each of the tap coefficients in the jitter compensating circuit 110 is converged, and simultaneously each of the tap coefficients used by the echo canceler 108 is modified by the following expression. Repeating this process prevents a residual error from growing, thereby successfully shifting the sampling phase.

$$C_k = C_k + J_k \cdot D \tag{7}$$

Next, the operation of canceling an echo and compensating a jitter in the transmission system on the subscriber side is explained.

On the subscriber side, transmission data are transmitted by the encoder 101 in synchronism with the sampling timing signal 114 on the receiving side using a received signal regenerated by the timing regenerating circuit 113. Therefore, an echo generated based on a transmission symbol transmitted before the generation of a jitter is canceled by an echo replica from the echo canceler 108 and a jitter compensating replica from the jitter compensating circuit 110. By contrast, an echo generated based on a transmission symbol transmitted after the generation of a jitter can be canceled only by an echo replica from the echo canceler 108 because, in this case, a phase difference does not exist between the sending side and the receiving side.

In the A/D converting unit 107, an echo component sampled at timing $t_0$ shown in FIG. 5, for example, is composed of each echo component, as shown in FIG. 5, generated based on each of the transmission symbols at $t_0$ and the preceding timing ..., $t_{-2}$, and $t_{-1}$. Likewise, the echo component sampled at timing $t_1$ is composed of each echo component generated based on each of the transmission symbols at timing $t_1$ and the preceding timing ..., $t_{-2}$, $t_{-1}$, and $t_0$. Generally, the echo component sampled at timing $t_j$ following timing $t_0$ is composed of each echo component generated based on each of the transmission symbols at timing $t_j$ and the preceding timing ..., $t_{-2}$, $t_{-1}$, $t_0$, ...

Accordingly, when the timing regenerating circuit 113 causes the phase of the sampling timing signal 114 to jump to the relative phase P or M (before or after the relative phase 0) at timing $t_0$ in FIG. 5 as in FIG. 4, for example, each echo component generated based on each transmission symbol transmitted at the timing preceding timing $t_0$, that is, timing ..., $t_{-2}$, and $t_{-1}$ can be canceled at any of the following timings $t_j$ (where $0 \leq j \leq K-1$) by each of the echo replica components based on each of the tap coefficients $C_N, C_{N-1}, \ldots, C_{1+j}$ from the echo canceler 108 and by each of the jitter compensating replica components based on each of the tap coefficients $J_K, \ldots, J_{1+j}$ from the jitter compensating circuit 110. Each echo component generated based on each transmission symbol transmitted at each of the timings $t_0$ and the following timings $t_1, \ldots, t_j$ can be canceled by each of the echo replica components based on each of the tap coefficients $C_j, \ldots, C_0$ from the echo canceler 108.

The echo component generated before timing $t_{-N}$ is attenuated sufficiently to be ignored. The jitter compensation component before timing $t_{-K}$ (N>K, that is, $t_{-N} < t_{-K}$) is also small enough to be ignored.

When the timing regenerating circuit 113 causes the phase of the sampling timing signal 114 to jump at timing 0 (=$t_0$) according to the principle of the above described jitter compensation, the jitter compensating replica $JR_j$ generated at the following timing j (=$t_j$, $0 \leq j \leq K$) by the jitter compensating circuit 110, shown in FIG. 3, in the transmission system on the subscriber side can be obtained by the following expression.

$$JR_j = \sum_{k=i+j}^{K} (a_{j-k} * J_k * D) \quad (0 \leq j \leq K - 1) \tag{8}$$

That is, the adder 305, shown in FIG. 3, in the jitter compensating circuit 110 selects and adds the outputs from the (1+j)th through K-th multipliers 304 out of the outputs from the 0-th through the K-th multipliers 304 in order to generate a jitter compensating replica $JR_j$ represented by expression 8 above.

An error signal $\epsilon_j'$ is obtained by the adder (subtracter) 111 using the following expression as obtained by expression 5 described above.

$$\epsilon_j' = X_j - ER_j - JR_j \tag{9}$$

The tap coefficient update unit 301 updates the tap coefficients $J_{I+j}$ through $J_K$ to reduce the value of the above described error signal $\beta_j'$. The following expression shows an example of the tap coefficient updating algorithm. $\epsilon$ is a constant.

$$J_k = J_k + \beta \cdot a_{j-k} \cdot D \cdot \epsilon_j' \quad (j: \text{time}, 1 + j \leq k \leq K) \tag{10}$$

Since the jitter compensation component at time j (K<j) can be assumed to be small enough to be ignored as described above, an output of the jitter compensating replica $JR_j$ from the jitter compensating circuit 110 is controlled to stop by a control circuit (not shown in the drawings) at time J (K<j).

An impulse response of an echo leaked from the sending side to the receiving side takes a long time in the digital subscriber line transmission system configured as shown in FIG. 1. Therefore, the length of a tap coefficient N in the echo canceler 108 and the length of a tap coefficient K in the jitter compensating circuit 110 indicate a large value if no special actions are taken.

Then, the impulse response of an echo must be made short by inserting a high-pass filter between the A/D converting unit 107 and the adder 109 shown in FIG. 1 so that the length of each tap coefficient in the echo canceler 108 and the jitter compensating circuit 110 can be shortened.

However, if the above described filter is mounted, the A/D conversion results before and after the generation of the jitter are included in the output of the filter immediately after the generation of a jitter. As a result, in the conventional jitter compensating circuit having the configuration shown in FIG. 3, it cannot be determined from what time point of the residual echo the component of the jitter compensating replica from the circuit should be removed, thereby causing a problem that the jitter cannot be compensated at all.

SUMMARY OF THE INVENTION

The present invention has been developed based on the above described background, and aims at ensuring appropriate jitter compensation using a transmission system which comprises a filter, for equalizing an echo characteristic, etc., provided at the consequent of an A/D converting unit on the receiving side, and cancels an echo at the consequent of the filter above.

That is, the present invention comprises a plurality of adaptive filter units, a selecting unit for sequentially selecting an output from the adaptive filter units after the timing regenerating unit generates a jitter according to the sampling timing signal, and for compensating the echo uncanceled by the echo canceler through the selected filter outputs, and a jitter component tap coefficient update unit for updating a set of tap coefficients of the adaptive filter unit selected by the selecting unit. The present invention is used in a transmission system comprising a signal converting unit for combining and separating a transmission signal and a received signal, an A/D converting unit for A/D converting a signal separated by the signal converting unit, a filter unit for filtering the output signal from the A/D converting unit, an echo canceler for removing from the output signal of the filter unit an echo from the sending side, and a timing regenerating unit for regenerating from a received signal a sampling timing signal used by the A/D converting unit.

In the present invention, a filter unit is provided between the A/D converting unit on the receiving side and the echo canceler in order to equalize the impulse response of an echo. Although the impulse response of a jitter may change in the output of the filter unit immediately after the generation of a jitter according to a sampling timing signal, an appropriate jitter compensating operation can be realized by compensating uncanceled echo by each output sequentially selected by the selecting unit through a plurality of adaptive filter units.

A tap coefficient storage unit can store plural sets of tap coefficients, and the selecting unit sequentially reads the sets of tap coefficients to operate an adaptive filter unit, thereby reducing the size of the jitter compensating circuit.

BRIEF DESCRIPTION OF THE DRAWINGS

Other objects and features of the present invention can be easily recognized by referring to the attached drawings and the description of the preferred embodiment.

DESCRIPTION OF THE PREFERRED EMBODIMENT

Explanation of the Principle

Figure 6:
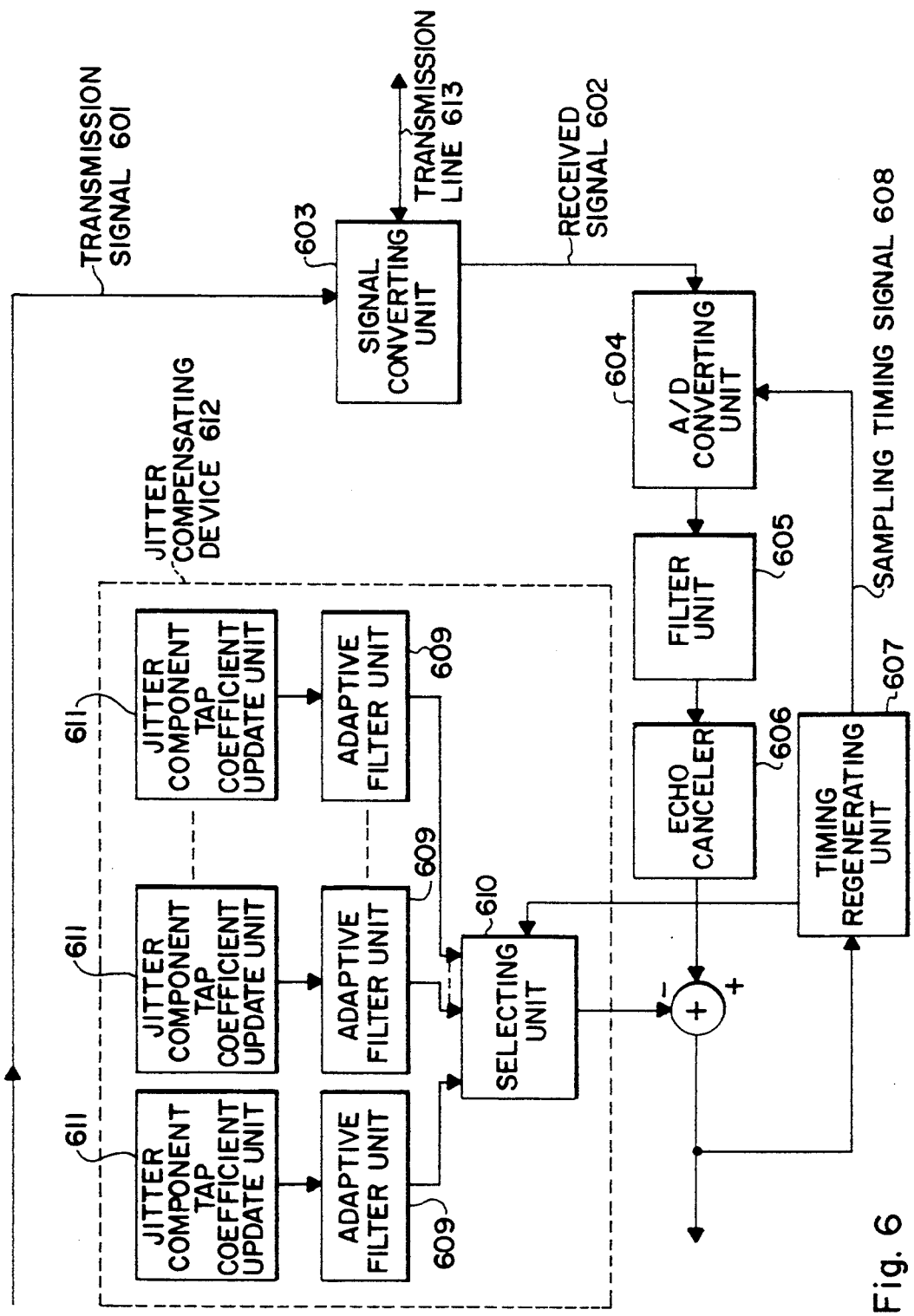
FIG. 6 is a block diagram for explaining the principle of the present invention.

FIG. 6 is a block diagram of the present invention.

The present invention relates to a transmission system such as a digital subscriber line transmission system comprising a signal converting unit 603 such as hybrid transformers, etc. for combining and separating a transmission signal 601 and a received signal 602 in a transmission line 613, an A/D converting unit 604 for A/D converting a separated signal, a filter unit 605 such as high-pass filters, etc. for filtering the output signal, an echo canceler 606 for removing from the output signal an echo from the sending side, and a timing regenerating unit 607 for regenerating from a received signal a sampling timing signal 608 used for the A/D converting unit 604.

It further comprises a jitter compensating device 612 having the following configuration.

That is, the jitter compensating device 612 comprises a plurality of adaptive filters 609.

Then, it comprises a selecting unit 610 for sequentially selecting an output from each of the adaptive filter units 609 after the timing regenerating unit 607 generates a jitter according to the sampling timing signal 608, and for compensating the residual echo uncanceled by the echo canceler 606 through the selected filter output.

The present invention further comprises a jitter component tap coefficient update unit 611 for updating the sets of tap coefficients, selected by the selecting unit 610, of the adaptive filter unit 609.

In the above described configuration of the present invention, only one adaptive filter unit is provided. The present invention can comprise a tap coefficient storage unit for storing plural sets of tap coefficients corresponding to a plurality of adaptive filtering characteristics. In this case, the selecting unit sequentially reads each of the sets of tap coefficients from the tap coefficient storage unit after the timing regenerating unit generates a jitter according a sampling timing signal, operates the adaptive filter unit according to each of the sets of tap coefficients, and compensates the echo uncanceled by the echo canceler according to the output of the filter. The jitter component tap coefficient update unit updates the sets of tap coefficients selected by the selecting units and stores them again into the tap coefficient storage unit.

The present invention can further comprise an echo component tap coefficient update unit for updating the sets of tap coefficients of the echo canceler 606 according to the sets of tap coefficients updated by the jitter component tap coefficient update unit.

In the above described configuration of the present invention, the digital subscriber line transmission system takes a long time to have an impulse response of an echo leaked from the sending side to the receiving side. The impulse response of an echo and the length of a tap coefficient of the echo canceler 606 can be shortened by providing a filter unit 605 between the A/D converting unit 604 and the echo canceler 606.

However, with the above described filter, the output from the filter unit 605 immediately after the generation of a jitter by the timing regenerating unit 607 according to the sampling timing signal 608 contains the A/D conversion results before and after the generation of a jitter, thereby changing an impulse answer of a jitter.

Then, the present invention further comprises a plurality of adaptive filter units 609 for compensating a jitter according to the change in the characteristic of a jitter immediately after the generation of a jitter at each time immediately after the generation of a jitter. After a jitter is generated by the timing regenerating unit 607 according to the sampling timing signal 608, the selecting unit 610 sequentially selects an output from each of the adaptive filter units 609, and an echo uncanceled by the echo canceler 606 can be compensated according to the selected filter output.

Thus, an appropriate jitter compensating operation can be realized.

The sets of tap coefficients, in the adaptive filter unit 609, selected by the selecting unit 610 can be updated separately by the jitter component tap coefficient update unit 611.

If only one adaptive filter unit 609 is provided, plural sets of tap coefficients are stored in the tap coefficient storage unit, and the selecting unit sequentially reads these tap coefficients and operates the adaptive filter unit, the size of the jitter compensating circuit can be efficiently reduced.

If the phase of a sampling timing signal is continuously shifted when, for example, a transmission system is provided in the equipment of the station, the sampling phase can be shifted without increasing a residual error by updating the sets of tap coefficients of the echo canceler 606 by a newly added echo component tap coefficient update unit according to the sets of tap coefficients updated by the jitter component tap coefficient update unit 611.

General Configuration

Figure 1:
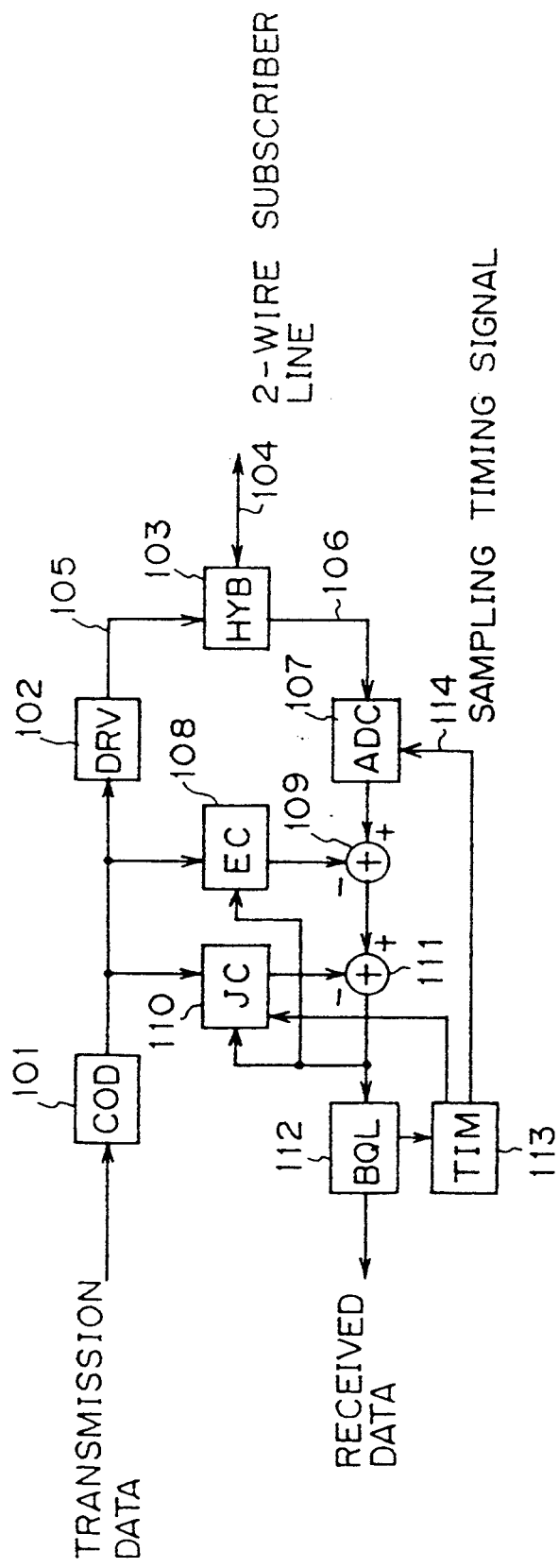
FIG. 1 shows an example of the configuration of the conventional digital subscriber line transmission system.
Figure 7:
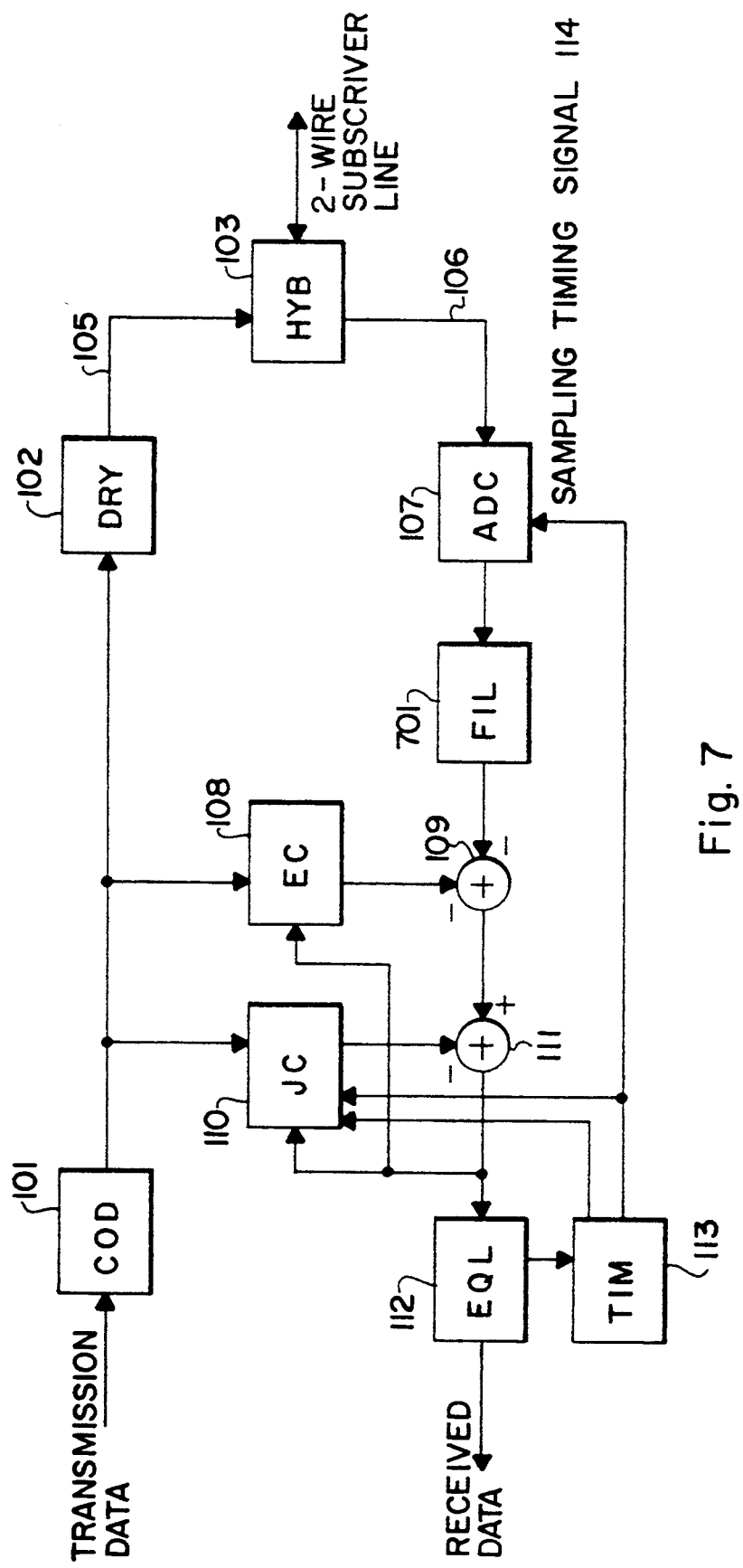
FIG. 7 shows the general configuration of the preferred embodiment of the digital subscriber line transmission system of the present invention.

FIG. 7 shows the general configuration of the preferred embodiment of the digital subscriber line transmission system of the present invention. In FIG. 7, a unit assigned the same number as that assigned to the conventional system shown in FIG. 1 has also the same function. FIG. 7 is different from FIG. 1 in that a filter 701 such as a high-pass filter for shortening an impulse response of an echo is inserted between the A/D converting unit 107 and the adder 109, and consequently the configuration in the jitter compensating circuit 110 is designed correspondingly, In FIG. 7, the echo canceler 108 has the same configuration as that shown in FIG. 2, and the initial values for the tap coefficients $C_0$-$C_N$ can be determined in consideration of the operations in the filter 701 as described later.

The 1st Embodiment of the Jitter Compensating Circuit 110

Figure 8:
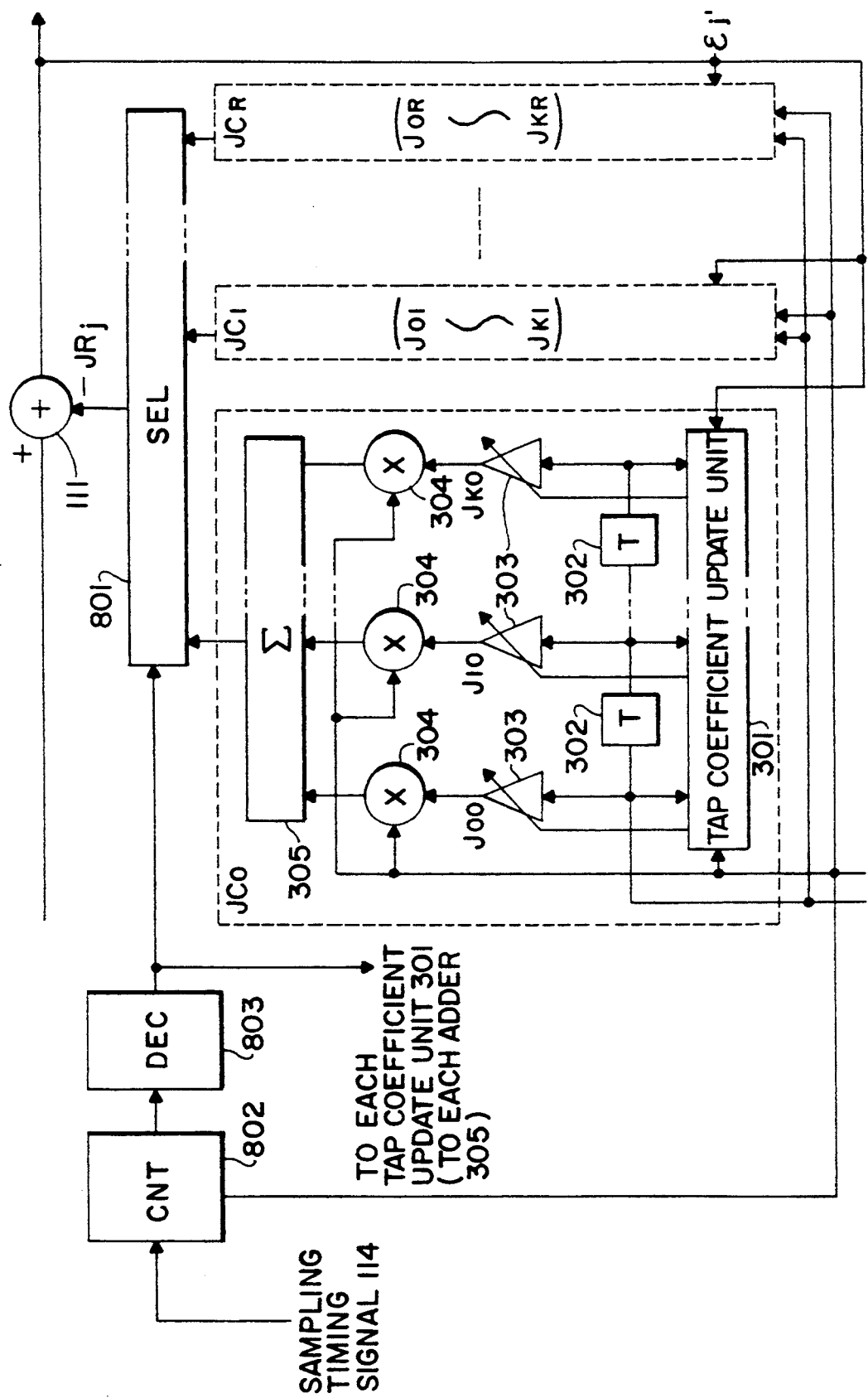
FIG. 8 shows the configuration of the first embodiment of the jitter compensating circuit of the present invention.

FIG. 8 shows the configuration of the first embodiment of the jitter compensating circuit 110 shown in FIG. 7.

Figure 3:
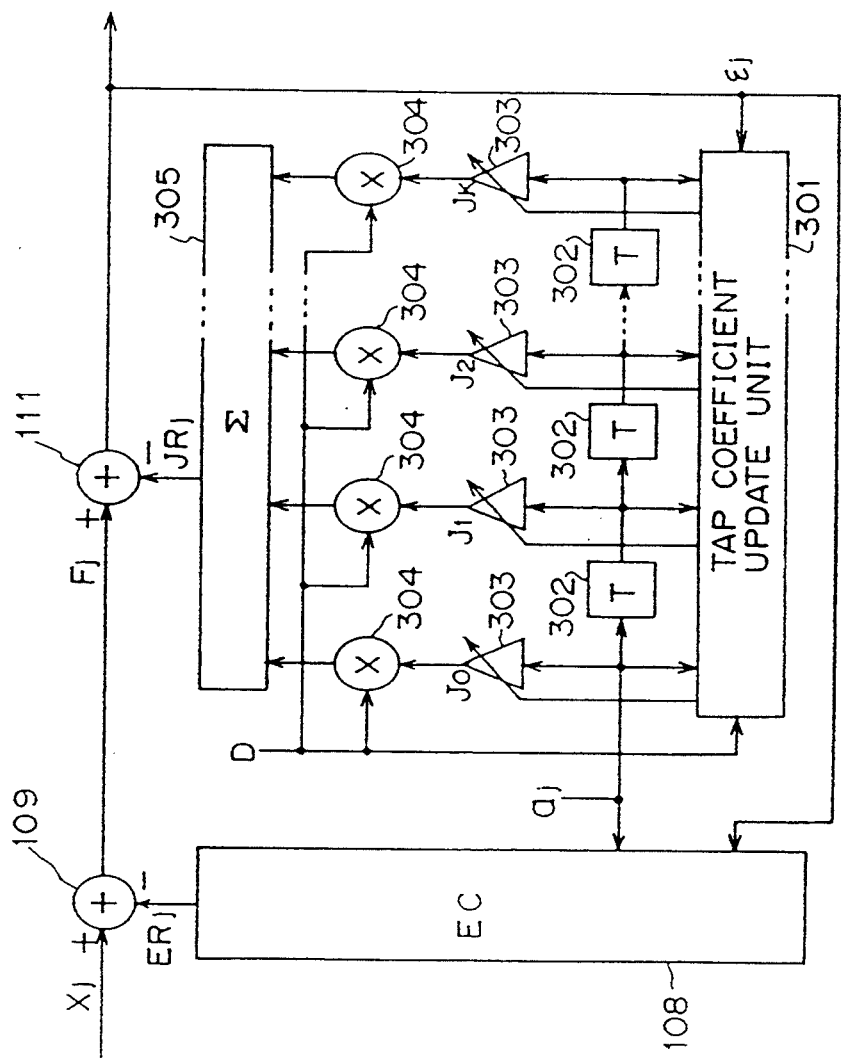
FIG. 3 shows an example of the configuration of the conventional jitter compensating circuit of FIG. 1.
Figure 4:
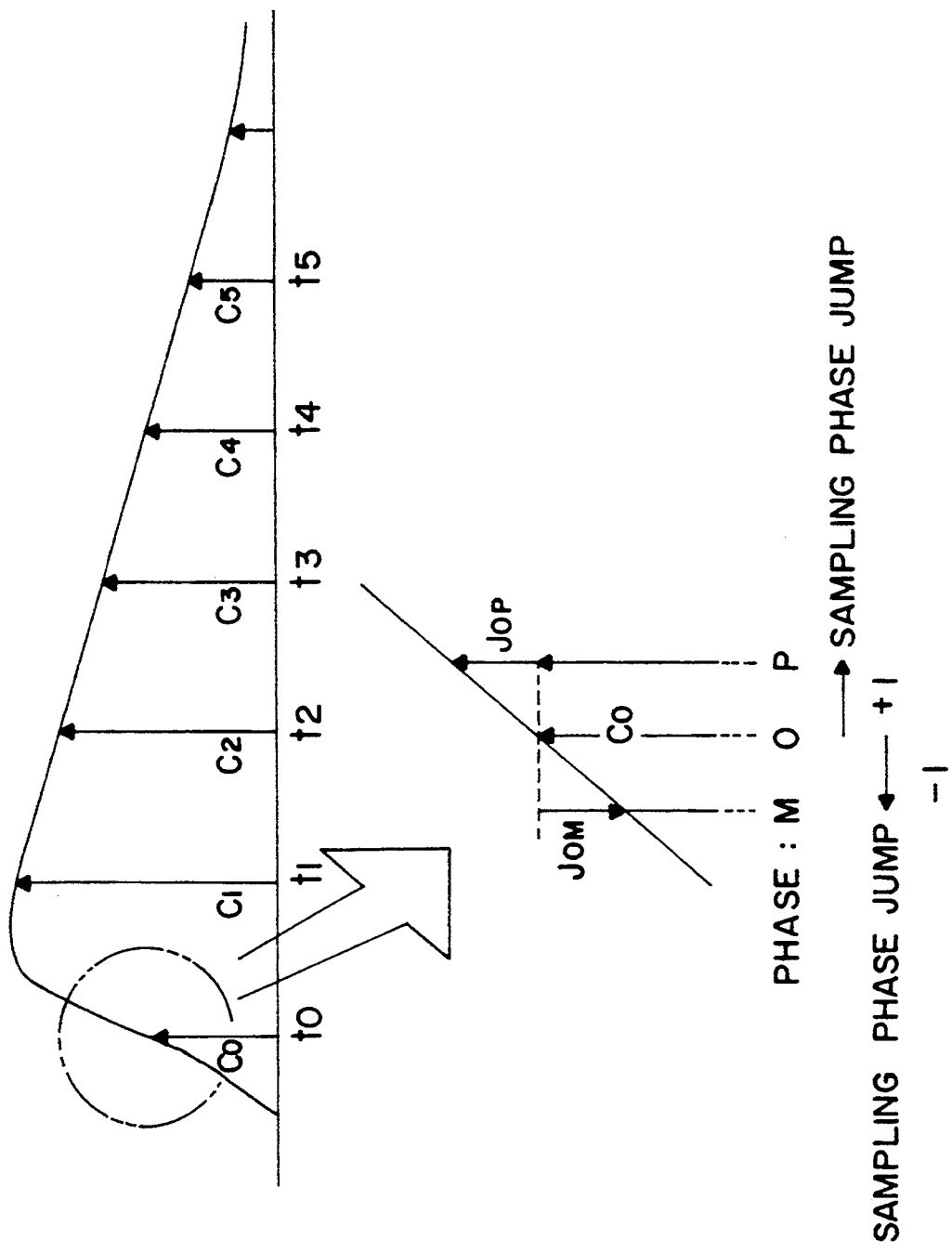
FIG. 4 is a view for explaining the jitter compensating operation in the equipment of an exchange station.
Figure 5:
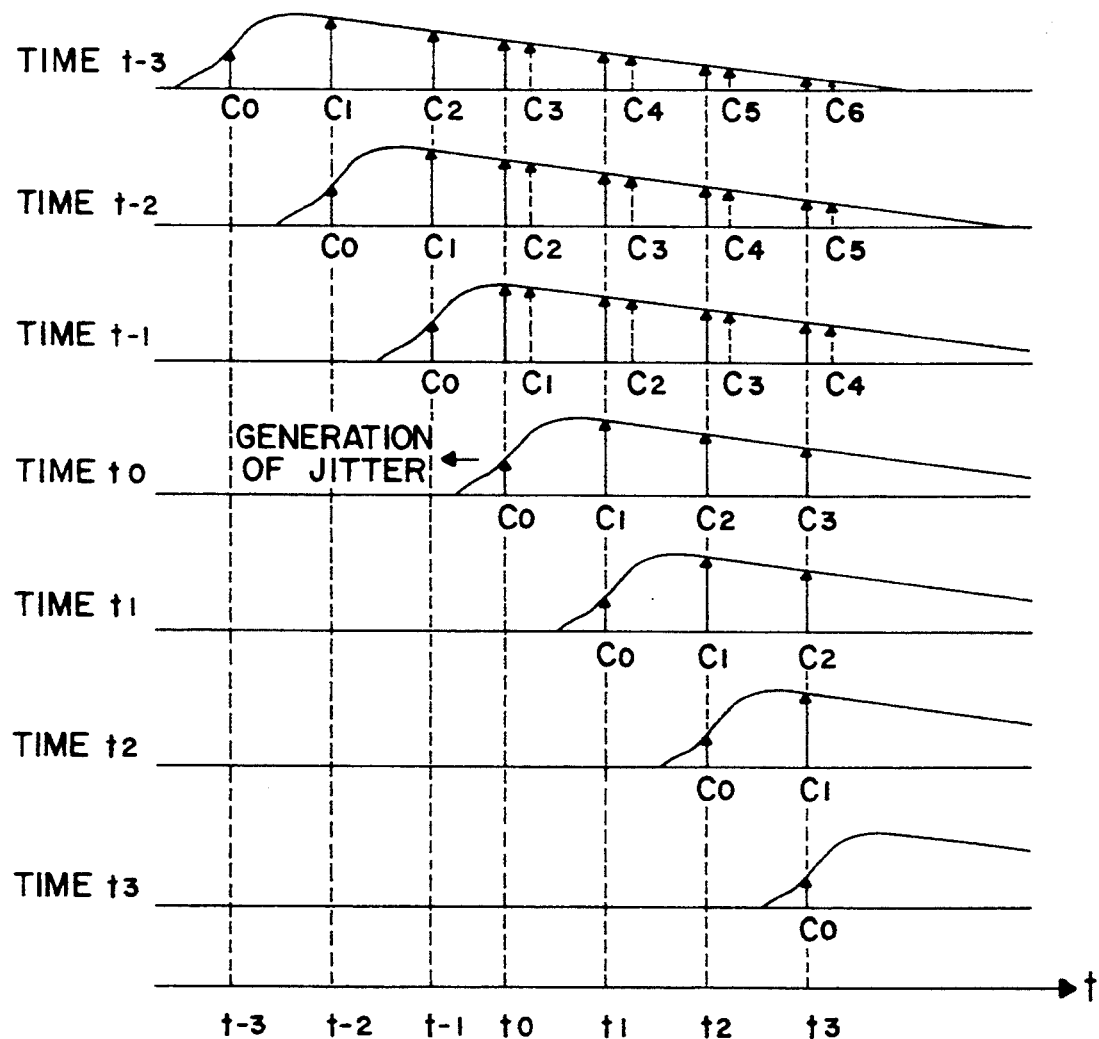
FIG. 5 is a view for explaining the jitter compensating operation in the equipment of a subscriber.

In the first embodiment of the jitter compensating circuit 110 as shown in FIG. 8, R+1 units (JC$_0$ through JC$_R$) of circuits similar to those shown in FIG. 3 (hereinafter referred to as a jitter compensating adaptive filter) are provided and output from one of them a jitter compensating replica $JR_R$ ($0 \leq j \leq R$). The outputted replica is selected by a selecting unit (SEL) 801 and outputted to the adder 111 (shown in FIG. 7).

A counter (CNT) 802 performs a counting operation according to a predetermined rule described later each time a sampling timing signal 114 is applied from the timing regenerating circuit 113 after the data D indicating the direction of a jitter from the timing regenerating circuit 113 shown in FIG. 7 are changed. A decoder (DEC) 803 controls the selecting unit 801 and the tap coefficient update unit 301 in each of the jitter compensating adaptive filters $JC_j$ ($0 \leq j \leq R$) according to the counter output of the above described counter 802. When the digital subscriber line transmission system shown in FIG. 7 is provided in the equipment of the subscriber, the decoder 803 also controls the adder 305 in each of the jitter compensating adaptive filters $JC_j$ ($0 \leq j \leq R$).

The principle of the operation of the first embodiment of the jitter compensating circuit 110 having the above described configuration, and the practical operation are described below sequentially.

Operation of the First Embodiment of the Jitter Compensating Circuit 110 in the Equipment of the Station First, the operation when the digital subscriber line transmission system is provided in the equipment of the station is described.

If time j=0 and the timing regenerating circuit 113 generates a jitter at the sampling timing signal 114, an echo $EH_j$ outputted from the A/D converting unit 107 at time j is obtained by the following expression.

$$EH_j = \begin{cases} \sum_{n=0}^{N} (a_{j-n} * CE_n) & (\text{if } j < 0) \\ \sum_{n=0}^{N} (a_{j-n} * CE_n) + \sum_{k=0}^{K} (a_{j-k} * CJ_k) & (\text{if } j \geq 0) \end{cases} \quad (11)$$

where $CE_n$ ($0 \leq n \leq N$) indicates a tap coefficient of an echo component (hereinafter referred to as an echo component tap coefficient ) when there are no jitter components; $CJ_K$ ($0 \leq k \leq K$) indicates a tap coefficient of a jitter component (hereinafter referred to as a jitter component tap coefficient).

According to expression 11, the output of the filter $EQ_j$ outputted by the filter 701 shown in FIG. 7 at time j can be obtained by expression 15 through the following expressions 12 through 14. The filter 701 is assumed as a transversal filter comprising tap coefficients $CQ_r$ ($0 \leq r \leq R$) from degree 0 through degree R.

That is, $$EQ_j = \sum_{r=0}^{R} (EH_{j-r} * CQ_r) \quad (12)$$

$$= \begin{cases} \sum_{r=0}^{R} \left[ \sum_{n=0}^{N} (a_{j-n-r} * CE_n) * CQ_r \right] & (\text{if } j < 0) \\ \sum_{r=0}^{R} \left[ \sum_{n=0}^{N} (a_{j-n-r} * CE_n) * CQ_r \right] + \\ \sum_{r=0}^{R} \left[ \sum_{k=0}^{K} (a_{j-k-r} * CJ_k) * CQ_r \right] & (\text{if } j \geq 0) \end{cases}$$

$$\begin{cases} \sum_{r=0}^{R} \left[ \sum_{n=0}^{N} (a_{j-n-r} * CE_n) * CQ_r \right] & (\text{if } j < 0) \\ \sum_{r=0}^{R} \left[ \sum_{n=0}^{N} (a_{j-n-r} * CE_n) * CQ_r \right] + \end{cases}$$

$$= \begin{cases} \sum_{r=0}^{j} \left[ \sum_{k=0}^{K} (a_{j-k-r} * CJ_k) * CQ_r \right] & \text{(if } 0 \leq j < R\text{)} \\ \sum_{r=0}^{R} \left[ \sum_{n=0}^{N} (a_{j-n-r} * CE_n) * CQ_r \right] + \\ \sum_{r=0}^{R} \left[ \sum_{k=0}^{K} (a_{j-k-r} * CJ_k) * CQ_r \right] & \text{(if } j \geq R\text{)} \end{cases}$$

where, $$\sum_{n=0}^{N} (a_{j-n-r} * CE_n) = \sum_{i=r}^{N+r} (a_{j-i} * CE_{i-r}) \quad (n+r=i) \tag{13}$$

$$= \sum_{i=0}^{N+R} (a_{j-i} * CE_{i-r})$$

$$\left( \begin{array}{l} \because CE_{i-r} = 0, i = 0 \sim r-1 \\ CE_{i-r} = 0, i = N+r \sim N+R \end{array} \right)$$

Likewise, $$\sum_{k=0}^{K} (a_{j-k-r} * CJ_k) = \sum_{i=0}^{K+R} (a_{j-i} * CJ_{i-r}) \tag{14}$$

Therefore, the following expression calculates the output of the filter $EQ_j$ using the results of expressions 12 through 14.

$$EQ_j = \begin{cases} \sum_{r=0}^{R} \left[ \sum_{n=0}^{N+R} (a_{j-n} * CE_{n-r}) * CQ_r \right] & \text{(if } j < 0\text{)} \\ \sum_{r=0}^{R} \left[ \sum_{n=0}^{N+R} (a_{j-n} * CE_{n-r}) * CQ_r \right] + \\ \sum_{r=0}^{r} \left[ \sum_{k=0}^{K+R} (a_{j-k} * CJ_{k-r}) * CQ_r \right] & \text{(if } 0 \leq j < R\text{)} \\ \sum_{r=0}^{R} \left[ \sum_{n=0}^{N+R} (a_{j-n} * CE_{n-r}) * CQ_r \right] + \\ \sum_{r=0}^{R} \left[ \sum_{k=0}^{K+R} (a_{j-k} * CJ_{k-r}) * CQ_r \right] & \text{(if } j \geq R\text{)} \end{cases} \tag{15}$$

$$= \begin{cases} \sum_{n=0}^{N+R} (a_{j-n} * \sum_{r=0}^{R} (CE_{n-r} * CQ_r)) & \text{(if } j < 0\text{)} \\ \sum_{n=0}^{N+R} (a_{j-n} * \sum_{r=0}^{R} (CE_{n-r} * CQ_r)) + \\ \sum_{k=0}^{K+R} (a_{j-k} * \sum_{r=0}^{j} (CJ_{k-r} * CQ_r)) & \text{(if } 0 \leq j < R\text{)} \\ \sum_{n=0}^{N+R} (a_{j-n} * \sum_{r=0}^{R} (CE_{n-r} * CQ_r)) + \\ \sum_{k=0}^{K+R} (a_{j-k} * \sum_{r=0}^{R} (CJ_{k-r} * CQ_r)) & \text{(if } j \geq R\text{)} \end{cases}$$

In expression 15 above, the first term:

$$\sum_{n=0}^{N+R} \left[ a_{j-n} * \sum_{r=0}^{R} (CE_{n-r} * CQ_r) \right] \tag{16}$$

indicates the echo component when there are no jitter components, and can be canceled by the echo replica $ER_j$ from the echo canceler 108 shown in FIG. 7 and obtained by expression 1 above.

Figure 2:
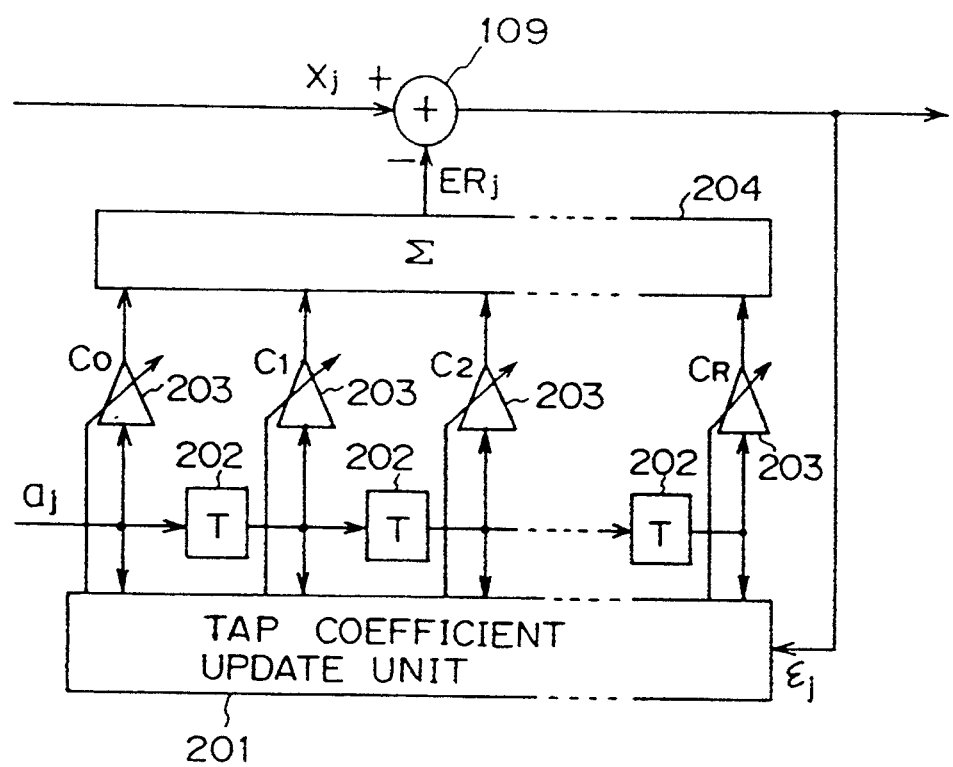
FIG. 2 shows an example of the configuration of the echo canceler of FIG. 1.

In the echo canceler 108, the above described tap coefficient update unit 201 shown in FIG. 2 updates the tap coefficient $C_n$ according to the update algorithm using expression 3, etc. The tap coefficient $C_n$ is converged to the value corresponding to the result of the following expression 17 contained in expression 16.

$$\sum_{r=0}^{R} (CE_{n-r} * CQ_r) \tag{17}$$

In expression 15, the following second term (expressions 18 and 19) in expression 15 correspond to a jitter component.

$$\sum_{k=0}^{K+R} \left[ a_{j-k} * \sum_{r=0}^{j} (CJ_{k-r} * CQ_r) \right] \text{(if } 0 \leq j < R\text{)} \tag{18}$$

$$\sum_{k=0}^{K+R} \left[ a_{j-k} * \sum_{r=0}^{R} (CJ_{k-r} * CQ_r) \right] \text{(if } j \geq R\text{)} \tag{19}$$

In the range $0 < j < R$, the jitter component has a value depending on time j as shown in expression 18. In the range $j \geq R$, the jitter component indicates a fixed value as shown in expression 19.

In the circuit configuration shown in FIG. 8 of the first embodiment of the jitter compensating circuit 110 shown in FIG. 7, the jitter component at time j is compensated (canceled) by the jitter compensating replica $JR_j$ from the j-th jitter compensating adaptive filter $JC_j$ shown in FIG. 8 in the range $0 \leq J < R$ In the range $J \leq R$, the jitter component at time j can be canceled by the jitter compensating replica $JR_R$ from the R-th jitter compensating adaptive filter $JC_R$ shown in FIG. 8.

In practice, assuming that the discrete time j synchronizes with the sampling timing signal 114, and that the data D indicating the direction of the jitter from the timing regenerating circuit 113 changes at time 0, the counter 802 shown in FIG. 8 indicates as the output of the counter a predetermined reset value out of the range between 0 and R at time j if $j < 0$, the value j at time j if $0 \leq j < R$, or the value R at time j if $j \geq R$.

When the above described output of the counter indicates a reset value, the decoder 803 shown in FIG. 8 causes the selecting unit 801 to output the value 0. If the output of the counter indicates the value j other than the reset value, the decoder 803 causes the selecting unit 801 to select the jitter compensating replica $JR_j$ ($0 \leq j \leq R$) outputted by the jitter compensating adaptive filter $JC_j$ having the number corresponding to the counter output value j.

The above described operation outputs the jitter compensating replica $JR_j$ obtained at time j by the selecting unit 801 shown in FIG. 8 according to the following expression 20.

$$\begin{cases} JR_j = 0 & (\text{if } j < 0) \\ JR_j = \sum_{k=0}^{K} (a_{j-k} * J_{kj} * D) & (\text{if } 0 \leq j < R) \\ JR_j = JR_R = \sum_{k=0}^{K} (a_{j-k} * J_{kR} * D) & (\text{if } R \leq j) \end{cases} \quad (20)$$

An error signal j' is obtained by the adder (subtracter) 111 as follows.

$$\epsilon_j = X_j - ER_j - JR_j \quad (21)$$

Each of the tap coefficient update units 301 of each jitter compensating adaptive filter $JC_j$ shown in FIG. 8 updates each of the tap coefficients $J_{0j}$–$J_{Kj}$ such that the above described error signal $\epsilon_j'$ can be reduced. The following expression shows an example of the tap coefficient update algorithm. $\beta$ indicates a constant.

$$\begin{cases} J_{kj}: \text{not to update} & (\text{if } j < 0) \\ J_{kj} = J_{kj} + \beta \cdot a_{j-k} \cdot D \cdot \epsilon_j' & (0 \leq k \leq K) \\ & (\text{if } 0 \leq j < R) \\ J_{kR} = J_{kR} + \beta \cdot a_{j-k} \cdot D \cdot \epsilon_j' & (0 \leq k \leq K)(\text{if } R \leq j) \end{cases} \quad (22)$$

That is, no tap coefficient update units 301 in any jitter compensating adaptive filters $JC_0$–$JC_R$ operate at time j (j<0) as shown by the first expression in expression 22.

At time j (0≤j<R), the decoder 803 instructs the tap coefficient update unit 301 in the J-th jitter compensating adaptive filter $JC_j$ to update the tap coefficient $J_{Kj}$ according to the second expression in expression 22 above. As a result, the tap coefficient $J_{Kj}$ converges to the value corresponding to the result of the following expression in expression 18 above.

$$\sum_{r=0}^{j} (CJ_{k-r} * CQ_r) \quad (23)$$

At time j (j≥R), the decoder 803 instructs the tap coefficient update unit 301 in the R-th jitter compensating adaptive filter $JC_R$ to update the tap coefficient $J_{KR}$ according to the third expression in expression 22 above. As a result, the tap coefficient $J_{KR}$ converges to the value corresponding to the result of the following expression in expression 19 above.

$$\sum_{r=0}^{R} (CJ_{k-r} * CQ_r) \quad (\text{if } j \geq R) \quad (24)$$

In the explanation above, the timing regenerating circuit 113 causes jitters at the relative phase P or M (before or after the relative phase 0) in the transmission system on the station side. However, when a phase is shifted continuously, for example, during the training for a timing regeneration, the phase is shifted after each of the tap coefficients $J_{kj}$ the jitter compensating adaptive filter $JC_j$ being selected in the jitter compensating circuit 110 is converged, and simultaneously each of the tap coefficients used by the echo canceler 108 is modified by the following expression. Repeating this process prevents a residual error from increasing, thereby successfully shifting the sampling phase.

$$C_k = C_k + J_{Kj} \cdot D \quad (25)$$

Operation of the First Embodiment of the Jitter Compensating Circuit 110 in the Equipment of a Subscriber Next, the operation when the digital subscriber line transmission system shown in FIG. 7 is provided in the equipment of a subscriber is explained.

If the timing regenerating circuit 113 generates a jitter according to the sampling timing signal 114 at time j=0, the echo $EH_j$ outputted by the A/D converting unit 107 shown in FIG. 7 at time j is obtained by the following expression.

$$EH_j = \begin{cases} \sum_{n=0}^{N} (a_{j-n} * CE_n) & (\text{if } j < 0, K \leq j) \\ \sum_{n=0}^{N} (a_{j-n} * CE_n) + \sum_{k=1+j}^{K} (a_{j-k} * CJ_k) \\ & (\text{if } 0 \leq j \leq K - 1) \end{cases} \quad (26)$$

Based on expression 26, the output of the filter $EQ_j$ outputted by the filter 701 shown in FIG. 7 at time j is obtained by expression 30 through expressions 27–29. The length of the tap coefficient R+1 of the filter 701 is obtained under the condition R<K.

That is, $$EQ_j = \sum_{r=0}^{R} (EH_{j-r} * CQ_r) = \quad (27)$$

$$\begin{cases} \sum_{r=0}^{R} \left[ \sum_{n=0}^{N} (a_{j-n-r} * CE_n) * CQ_r \right] (\text{if } j < 0, K+R \leq j) \\ \sum_{r=0}^{R} \left[ \sum_{n=0}^{N} (a_{j-n-r} * CE_n) * CQ_r \right] + \\ \sum_{r=0}^{j} \left[ \sum_{k=1+j+r}^{K} (a_{j-k-r} * CJ_k) * CQ_r \right] (\text{if } 0 \leq j < R) \\ \sum_{r=0}^{R} \left[ \sum_{n=0}^{N} (a_{j-n-r} * CE_n) * CQ_r \right] + \\ \sum_{r=0}^{R} \left[ \sum_{k=1+j+r}^{K} (a_{j-n-r} * CJ_k) * CQ_r \right] (\text{if } R \leq j < K) \\ \sum_{r=0}^{R} \left[ \sum_{n=0}^{N} (a_{j-n-r} * CE_n) * CQ_r \right] + \\ \sum_{r=j-K+1}^{R} \left[ \sum_{k=1+j+r}^{K} (a_{j-k-r} * CJ_k) * CQ_r \right] \\ (\text{if } K \leq j < K + R) \end{cases}$$

where, $$\sum_{n=0}^{N} (a_{j-n-r} * CE_n) = \sum_{i=r}^{N+r} (a_{j-1} * CE_{i-r})(n+r=1) = \quad (28)$$

$$\sum_{i=0}^{N+R} (a_{j-i} * CE_{i-r})$$

-continued $$\left( \because CE_{i-r} = 0, i = 0 \sim r - 1 \atop CE_{i-r} = 0, i = N+r \sim N + R \right)$$

Likewise, $$\sum_{k=1+j+r}^{K} (a_{j-k-r} * CJ_k) = \sum_{i=1+j}^{K+r} (a_{j-i} * CJ_{i-r}) (k + r = i) = \quad (29)$$

$$\sum_{i=1+j}^{K+R} (a_{j-i} * CJ_{i-r})$$

$$(\because CJ_{i-r} = 0, i = K + r \sim K + R)$$

Therefore, the output of the filter $EQ_j$ can be obtained by the following expression.

$$EQ_j = \begin{cases} \sum_{r=0}^{R}\left[\sum_{n=0}^{N+R}(a_{j-n} * CE_{n-r}) * CQ_r\right] & \text{(if } j < 0, K + R \le i) \\ \sum_{r=0}^{R}\left[\sum_{n=0}^{N+R}(a_{j-n} * CE_{n-r}) * CQ_r\right] + \\ \sum_{r=0}^{j}\left[\sum_{k=1+j}^{K+R}(a_{j-k} * CJ_{k-r}) * CQ_r\right] & \text{(if } 0 \le j < R) \\ \sum_{r=0}^{R}\left[\sum_{n=0}^{N+R}(a_{j-n} * CE_{n-r}) * CQ_r\right] + \\ \sum_{r=0}^{R}\left[\sum_{k=1+j}^{K+R}(a_{j-k} * CJ_{k-r}) * CQ_r\right] & \text{(if } R \le j < K) \\ \sum_{r=0}^{R}\left[\sum_{n=0}^{N+R}(a_{j-n} * CE_{n-r}) * CQ_r\right] + \\ \sum_{r=j-K+1}^{j}\left[\sum_{k=1+j}^{K+R}(a_{j-k} * CJ_{k-r}) * CQ_r\right] \\ \text{(if } K \le j < K + R) \end{cases}$$

(30)

$$= \begin{cases} \sum_{n=0}^{N+R}\left(a_{j-n} * \sum_{r=0}^{R}(CE_{n-r} * CQ_r)\right) & \text{(if } j < 0, K + R \le j) \\ \sum_{n=0}^{N+R}\left(a_{j-n} * \sum_{r=0}^{R}(CE_{n-r} * CQ_r)\right) + \\ \sum_{k=1+j}^{K+R}\left(a_{j-k} * \sum_{r=0}^{j}(CJ_{k-r} * CQ_r)\right) & \text{(if } 0 \le j < R) \\ \sum_{n=0}^{N+R}\left(a_{j-n} * \sum_{r=0}^{R}(CE_{n-r} * CQ_r)\right) + \\ \sum_{k=1+j}^{K+R}\left(a_{j-k} * \sum_{r=0}^{R}(CJ_{k-r} * CQ_r)\right) & \text{(if } R \le j < K) \\ \sum_{n=0}^{N+R}\left(a_{j-n} * \sum_{r=0}^{R}(CE_{n-r} * CQ_r)\right) + \\ \sum_{k=1+j}^{K+R}\left(a_{j-k} * \sum_{r=j-K+1}^{R}(CJ_{k-r} * CQ_r)\right) \\ \text{(if } K \le j < K + R) \end{cases}$$

In expression 30 above, the first term indicates the echo component when no jitter components exist as in the above described case in the equipment of a station, and can be canceled by the echo replica $ER_j$ obtained by the above described expression 1 from the echo canceler 108 shown in FIG. 7 (refer to expressions 16 and 17).

In expression 30, the following second terms correspond to the jitter component.

$$\sum_{k=1+j}^{K+R}\left[a_{j-k} * \sum_{r=0}^{j}(CJ_{k-r} * CQ_r)\right] \text{(if } 0 \le j < R) \quad (31)$$

$$\sum_{k=1+j}^{K+R}\left[a_{j-k} * \sum_{r=0}^{R}(CJ_{k-r} * CQ_r)\right] \text{(if } R \le j < K) \quad (32)$$

$$\sum_{k=1+j}^{K+R}\left[a_{j-k} * \sum_{r=j-K+1}^{R}(CJ_{k-r} * CQ_r)\right] \quad (33)$$

(if $K \le j < K + R$)

In the range $0 \le j < R$, the jitter component indicates a value depending on time j as shown in expression 31, while in the range $R \le j < K$, the jitter component indicates a fixed value as shown in expression 32.

In the range $K \le j < K+R$, the jitter component has a value depending on time j as indicated by expression 33. Since the jitter component is attenuated sufficiently within this range, the value of the jitter component in the above described range can be approximated to 0.

Therefore, in the circuit configuration shown in FIG. 8 of the first embodiment of the jitter compensating circuit 110 shown in FIG. 7, the jitter component at time j is canceled by the jitter compensating replica $JR_j$ from the j-th jitter compensating adaptive filter $JC_j$ shown in FIG. 8 in the range $0 \le j < R$ as in the above described case in the equipment of a station. In the range $R \le j < K$, the jitter component at time j can be canceled by the jitter compensating replica $JR_R$ from the R-th jitter compensating adaptive filter $JC_R$ shown in FIG. 8.

In practice, assuming that the discrete time j synchronizes with the sampling timing signal 114, and that the data D indicating the direction of the jitter from the timing regenerating circuit 113 changes at time 0, the counter 802 shown in FIG. 8 indicates as the output of the counter a predetermined reset value out of the range between 0 and R at time j if $j < 0$, the value j at time j if $0 \le j < K$, or the reset value again at time j if $K \le j$.

When the above described output of the counter indicates a reset value, the decoder 803 shown in FIG. 8 causes the selecting unit 801 to output the value 0. When it indicates the value j if $0 \le j < R$, the decoder 803 causes the selecting unit 801 to select the jitter compensating replica $JR_j (0 \le j \le R)$ outputted by the jitter compensating adaptive filter $JC_j$ having the number corresponding to the counter output value j. If the above described counter output indicates the value j when $R \le j < K$, the decoder 803 causes the selecting unit 801 to select the jitter compensating replica $JR_R$ outputted by the R-th jitter compensating adaptive filter $JC_R$.

The above described operation outputs the jitter compensating replica $JR_j$ obtained at time j by the selecting unit 801 shown in FIG. 8 according to the following expression 20.

$$\begin{cases} JR_j = 0 & (\text{if } j < 0, K \leq j) \\ JR_j = \sum_{k=1+j}^{K} (a_{j-k} * J_{kj} * D) & (\text{if } 0 \leq j < R) \\ JR_j = JR = \sum_{k=1+j}^{K} (a_{j-k} * J_{kR} * D) & (\text{if } R \leq j < K) \end{cases} \quad (34)$$

That is, the j-th adder 305, shown in FIG. 8, in the jitter compensating circuit 110 selects and adds the outputs from the (1+j)th through K-th multipliers 304 out of the outputs from the 0-th through the K-th multipliers 304 in order to generate a jitter compensating replica $JR_j$ represented by expression 34 above.

An error signal $\epsilon_j'$ is obtained by the adder (subtracter) 111 using the following expression as obtained by expressions 5, 9, or 21 described above.

$$\epsilon_j' = x_j - ER_j - JR_j \quad (35)$$

Each of the tap coefficient update units 301 of each jitter compensating adaptive filter $JC_j$ shown in FIG. 8 updates each of the tap coefficients $J_{0j}$–$J_{Kj}$ such that the above described error signal $\epsilon_j'$ can be reduced. The following expression shows an example of the tap coefficient update algorithm. $\beta$ indicates a constant.

$$\begin{cases} J_{kj}: \text{not to update} & (\text{if } j = 0, K \leq j) \\ J_{kj} = J_{kj} + \beta \cdot a_{j-k} \cdot D \cdot \epsilon_j' & (\text{if } 0 \leq j < R) \\ & (1 + j \leq k \leq K) \\ J_{kR} = J_{kR} + \beta \cdot a_{j-k} \cdot D \cdot \epsilon_j' & (\text{if } R \leq j < K) \end{cases} \quad (36)$$

That is, no tap coefficient update units 301 in any jitter compensating adaptive filters $JC_0$–$JC_R$ operate at time j (J<0 or K≤j) as shown by the first expression in expression 36.

At time j (0≤j<R), the decoder 803 instructs the tap coefficient update unit 301 in the j-th jitter compensating adaptive filter $JC_j$ to update the tap coefficient $J_{Kj}$ (1+j≤k≤K) according to the second expression in expression 36 above. As a result, the tap coefficient $J_{Kj}$ converges to the value corresponding to the result of the following expression in expression 31 above.

$$\sum_{r=0}^{j} (CJ_{k-r} * CQ_r) \quad (37)$$

At time j (R≤j<K), the decoder 803 instructs the tap coefficient update unit 301 in the R-th jitter compensating adaptive filter $JC_R$ to update the tap coefficient $J_{KR}$ according to the third expression in expression 36 above. As a result, the tap coefficient $J_{KR}$ converges to the value corresponding to the result of the following expression in expression 32 above.

$$\sum_{r=0}^{R} (CJ_{k-r} * CQ_r) \quad (38)$$

To realize a jitter compensation precisely, R units of jitter compensating adaptive filters for generating a jitter compensating replica corresponding to the above described expression 33 at time j (K≤J<K+R) must be added to the jitter compensating circuit 110 and perform a jitter compensating operation using these filters selectively.

The 2nd Embodiment of the Jitter Compensating Circuit 110

Figure 9:
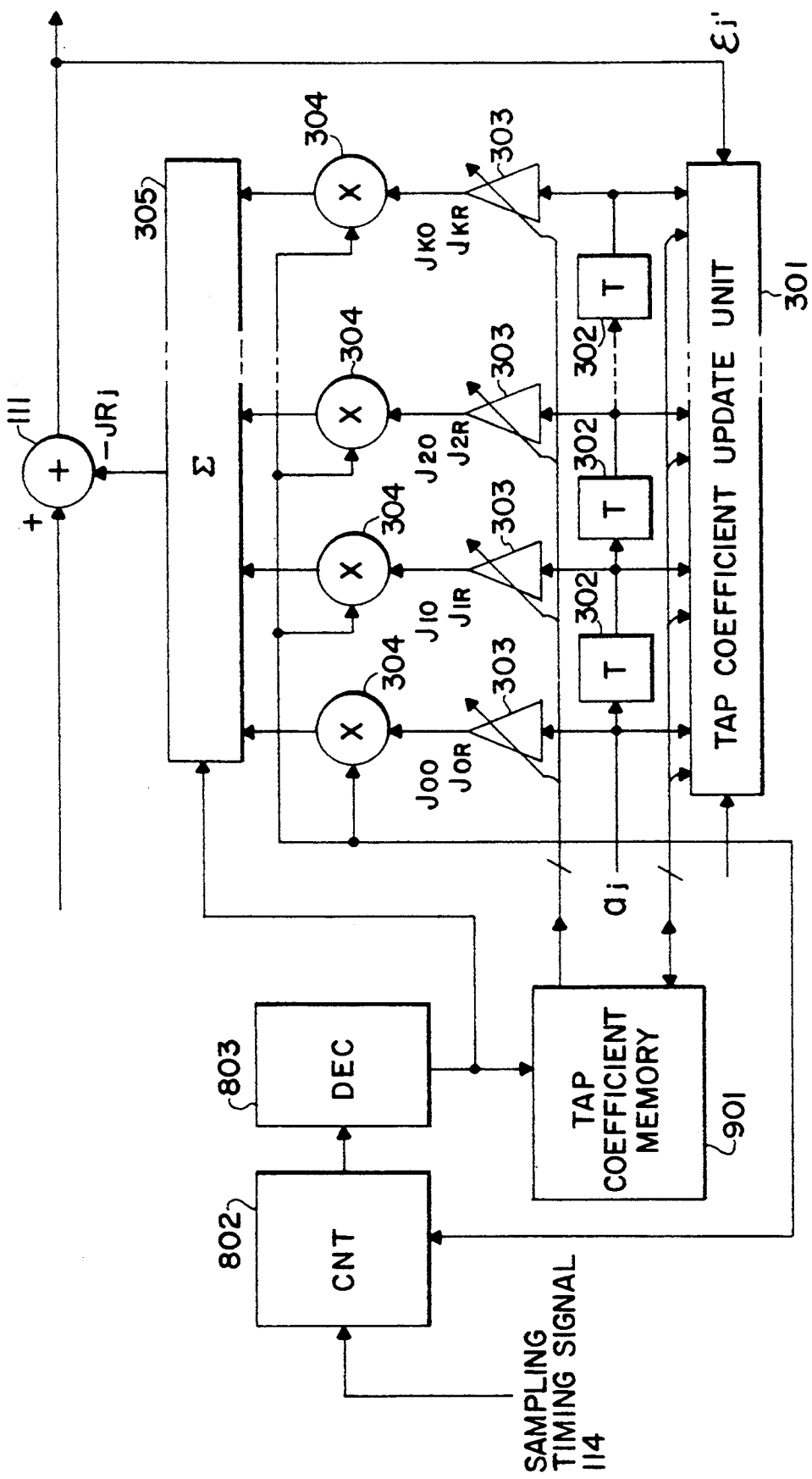
FIG. 9 shows the configuration of the second embodiment of the jitter compensating circuit of the present invention.

FIG. 9 shows the configuration of the second embodiment of the jitter compensating circuit 110 shown in FIG. 7.

In the first embodiment shown in FIG. 8, (R+1) units of jitter compensating active filters $JC_j$(0≤j≤R) corresponding to each time j after the generation of a jitter are used selectively under control of the counter 802 and the decoder 803. By contrast, in the second embodiment shown in FIG. 9, only a set of jitter compensating adaptive filters are provided, and, instead, each of the sets of tap coefficients $J_{Kj}$ ($J_{00}$–$J_{K0}$), ($J_{01}$–$J_{K1}$), ..., ($J_{0R}$–$J_{KR}$) in each of the jitter compensating adaptive filters $JC_j$ shown in FIG. 8 is stored in a coefficient memory 901. A set of tap coefficients ($J_{0j}$–$J_{Kj}$) corresponding to each time j after the generation of a jitter is read to each multiplier 303 under control of the counter 802 and the decoder 803, thereby generating a corresponding jitter compensating replica $JR_j$. The set of the above described tap coefficients ($J_{0j}$–$J_{Kj}$) is updated as described for the tap coefficient update unit 301, and stored again in the tap coefficient memory 901.

The practical operation of compensating a jitter is performed as described for the first embodiment shown in FIG. 8.

With the above described configuration, the size of the circuit of the jitter compensating circuit 110 can be reduced.

What is claimed is:

1. A jitter compensating device used in a transmission system, the transmission system comprising a signal converting unit for separating a transmitted signal and a received signal, an analog-to-digital (A/D) converting unit for A/D converting the received signal separated by said signal converting unit, a filter unit for filtering an output signal from said A/D converting unit to generate a filtered signal, an echo canceler for removing, from said filtered signal, an echo resulting during transmission to produce a first signal, a combining unit for combining said first signal with a second signal to produce a compensated signal, and a timing regenerating unit for regenerating, from a compensated signal, a sampling timing signal used by said A/D converting unit, said jitter compensating device comprising:
  a plurality of adaptive filter means,
  selecting means for sequentially selecting an adaptive filtering means from said plurality of adaptive filter means after said timing regenerating unit generates a jitter according to said sampling timing signal, wherein said selected adaptive filter means generates said second signal for compensating any echo uncanceled by said echo canceler through said combining means, and
  jitter component tap coefficient update means for updating tap coefficients of said selected adaptive filter means selected by said selecting means based on said compensated signal.

2. A jitter compensating device used in a transmission system, the transmission system comprising a signal converting unit separating a transmitted signal and a received signal, an analog-to-digital (A/D) converting unit for A/D converting the received signal separated by said signal converting unit, a filter unit for filtering an output signal from said A/D converting unit generate a filtered signal, an echo canceler for removing, from said filtered signal, an echo resulting during transmission to produce a first signal, a combining unit for combining said first signal with a second signal to produce said compensated signal, a timing regenerating unit for regenerating, from said compensated signal, a sampling timing signal used by said A/D converting unit, said jitter compensating device comprising:

adaptive filter means, tap coefficient storage means for storing plural sets of tap coefficients corresponding to a plurality of adaptive filtering characteristics, selecting means for sequentially selecting, from said tap coefficient storage means, a set of tap coefficients from said plural sets of tap coefficients after said timing regenerating unit generates a jitter according to said sampling timing signal, wherein said adaptive filter means operates according to said selected set of tap coefficients to generate said second signal for compensating any echo uncanceled by said echo canceler through said combining means, and jitter component tap coefficient update means for updating said set of tap coefficients selected by said selecting means based on said compensating signal and for storing the updated set of tap coefficients again in said tap coefficient storage means.

3. The jitter compensating device according to claim 1 wherein:

the echo canceler includes a set of tap coefficients and a tap coefficient update means connected to receive the compensated signal for updating tap coefficient used in said echo canceler.

4. The jitter compensating device according to claim 1 wherein:

the echo canceler includes a set of tap coefficients and a tap efficient update means connected to receive the compensated signal for updating tap coefficients used in said echo canceler.

* * * * *

UNITED STATES PATENT AND TRADEMARK OFFICE
CERTIFICATE OF CORRECTION

PATENT NO. : 5,375,147
DATED : December 20, 1994
INVENTOR(S) : Awata, et al.

It is certified that error appears in the above-indentified patent and that said Letters Patent is hereby corrected as shown below:

On the title page item [57],
Abstract, line 1, delete "litter" and insert --jitter--.

Abstract, line 3, delete "litter" and insert --jitter--.

Column 1, line 62, delete "3" and insert --j--.

Column 4, line 2, delete "Jumps" and insert --jumps--.

Column 4, line 12, delete "-$J_{2M}$" and insert --, $J_{2M}$--.

Column 4, line 44, delete "-$J_{2M}$" and insert --, $J_{2M}$--.

Column 6, line 23, delete "$e_j$" and insert --$e_j'$--.

Column 6, line 27, delete "$\beta_j$" and insert --$e_j'$--.

Column 6, line 29, delete "$e$" and insert --$\beta$--.

Column 10, line 67, delete "$\frac{EN}{n=0}$" and insert -- $\overset{N}{\underset{n=0}{E}}$ --.

UNITED STATES PATENT AND TRADEMARK OFFICE
CERTIFICATE OF CORRECTION

PATENT NO. : 5,375,147
DATED : December 20, 1994
INVENTOR(S) : Awata, et al.

It is certified that error appears in the above-indentified patent and that said Letters Patent is hereby corrected as shown below:

Column 12, line 43, after "R" insert --.--.

Column 12, line 44, delete "$J \leq R$" and insert --$J \geq R$--.

Column 12, line 54, delete "$j \leq R$" and insert --$j \geq R$--.

Column 13, line 13, delete "$e_j$" and insert --$e_j'$--.

Column 14, line 64, delete "1" and insert --i--.

Column 17, line 65, delete "J" and insert --j--.

Signed and Sealed this

Third Day of October, 1995

BRUCE LEHMAN

*Attest:*

*Attesting Officer*      *Commissioner of Patents and Trademarks*